United States Patent
Flynn

(10) Patent No.: US 7,175,292 B2
(45) Date of Patent: Feb. 13, 2007

(54) HAND ADJUSTABLE VEHICLE MIRROR MECHANISM

(75) Inventor: Darryl Flynn, St. Gilberton (AU)

(73) Assignee: Schefenacker Vision Systems Australia Pty Ltd, Lonsdale (AU)

( * ) Notice: Subject to any disclaimer, the term of this patent is extended or adjusted under 35 U.S.C. 154(b) by 95 days.

(21) Appl. No.: 10/484,589

(22) PCT Filed: Aug. 6, 2002

(86) PCT No.: PCT/AU02/01039

§ 371 (c)(1),
(2), (4) Date: Jan. 23, 2004

(87) PCT Pub. No.: WO03/013908

PCT Pub. Date: Feb. 20, 2003

(65) Prior Publication Data

US 2004/0184171 A1    Sep. 23, 2004

(30) Foreign Application Priority Data

Aug. 6, 2001    (AU) .................................... PR6832

(51) Int. Cl.
*B60R 1/066*    (2006.01)
(52) U.S. Cl. .................. 359/876; 248/481; 248/487
(58) Field of Classification Search ............... 359/879, 359/838, 841, 860, 862, 865, 871, 876
See application file for complete search history.

(56) References Cited

U.S. PATENT DOCUMENTS

| 4,555,166 | A | * | 11/1985 | Enomoto | ............... 359/874 |
| 4,764,004 | A | | 8/1988 | Yamada et al. | |
| 4,826,305 | A | | 5/1989 | Ogasawara | |
| 4,981,279 | A | | 1/1991 | Andreas et al. | |
| 5,629,810 | A | | 5/1997 | Perry et al. | |
| 5,938,155 | A | | 8/1999 | Garland | |
| 5,943,176 | A | * | 8/1999 | Mertens | ............... 359/872 |
| 5,969,891 | A | * | 10/1999 | Otenio et al. | ............... 359/871 |
| 6,050,537 | A | | 4/2000 | Fimeri | |
| 6,168,279 | B1 | | 1/2001 | Schnell | |
| 6,302,549 | B1 | | 10/2001 | Branham et al. | |

FOREIGN PATENT DOCUMENTS

| DE | 199 02 755 | 7/2000 |
| DE | 199 02 756 | 7/2000 |
| EP | 170296 B1 | 9/1988 |
| EP | 0 352 762 | 7/1989 |
| EP | 269081 B1 | 3/1991 |
| FR | 71.46922 | 6/1972 |
| JP | 60-75143 | 5/1985 |
| JP | 200 01 59021 | 6/2000 |
| WO | WO 94/26556 | 11/1994 |
| WO | WO 99/00272 | 1/1999 |

* cited by examiner

*Primary Examiner*—Mark A Robinson
(74) *Attorney, Agent, or Firm*—Warn, Hoffmann, Miller & LaLone, P.C.

(57) ABSTRACT

An external mirror assembly for a motor vehicle with a base (16) and an adjustable mirror head (12) and a pivot and vibration absorption mechanism (14) on the base (16) allowing manual adjustment of the mirror head (12) with respect to the base (16). The pivot and vibration absorption mechanism (14) has a ball joint (22, 26) to enable pivoting and frictionally engaging faces (36, 38, 42) spaced apart from the ball joint (22, 26) on the base (16) and the mirror head (12) to provide vibration absorption. The respective faces (36, 38, 42) are part spherical surfaces resiliently urged together by resilient means (46).

12 Claims, 4 Drawing Sheets

HAND ADJUSTABLE VEHICLE MIRROR MECHANISM

This application is a National Stage of International Application No. PCT/AU02/01039, filed Aug. 6, 2002, which claims the priority of Australian Patent Application Serial No. PR 6832, filed Aug. 6, 2001.

FIELD OF INVENTION

This invention relates to a pivot mechanism which is adapted for manual adjustment.

Although this specification will be generally discussed in relation to its application to external rear vision mirrors for motor vehicles, it is to be realised that it is useful for a wider range of applications.

BACKGROUND OF THE INVENTION

An external rear vision mirror for a motor vehicle, must be adjusted for each driver and when adjusted for that driver, it is desirable that the angle of the mirror stays at that set position. There is first of all a requirement that there is some feel or tactile response when a driver is making angle adjustments so that the mirror does not move too quickly when adjustment pressures are placed upon it, but that it moves evenly and non-resiliently. A second requirement is that once in a set position, vibration of the motor vehicle as it is driven along does not change the set position of the mirror.

To overcome these problems therefore, it is necessary to have an adjustment system which has some form of frictional load applied to it.

It is an object therefore, of this invention to provide an adjustment arrangement particularly adapted for external rear vision mirrors for vehicles but as indicated above the invention is suitable for other applications as well.

BRIEF DESCRIPTION OF THE INVENTION

In one form therefore, although this may not necessarily be the only or broadest form, the invention is said to reside in a movement controller assembly having a base member and a pivoting member and adapted to control movement of the pivoting member with respect to the base member, the pivot mechanism allowing manual adjustment of the pivot mechanism with respect to the base member, the pivot mechanism having a ball joint to enable pivoting and frictionally engaging faces on the base and pivot mechanisms to provide vibration absorption characterised by the respective faces being part spherical surfaces spaced apart from the ball joint and urged together by resilient means.

In an alternative form, the invention is said to reside in a movement control assembly having a base member and a pivoting member and adapted to control movement of the pivoting member with respect to the base member, the base member having a body defining a first internal concave part spherical surface and a plurality of first tongues together defining a second external convex part spherical surface having a radius of curvature less than the radius of curvature of the first part spherical surface, the pivoting member having a plurality of second tongues, faces of the second tongues together defining a third external convex part spherical surface and a fourth internal concave part spherical surface having a radius of curvature less than the third external surface, the second tongues adapted to engage between the first internal surface and the first tongues, and a resilient means adapted to urge the first tongues against the first surface thereby engaging the second tongues between them to provide frictional load against movement of the pivoting member with respect to the base member.

Preferably there are four first tongues, four second tongues and four resilient means with one resilient means for each combination of first and second tongues. The resilient means can be by innate resilience of one or more of the tongues or may be by a spring arrangement.

The spring arrangement may be a compression spring clip with legs adapted to bear against the body and first tongue respectively and to engage the second tongue therebetween.

There may be further provided a yoke acting between the base member and the pivoting member to prevent rotation of the pivoting member with respect to the base member on an axis normal to the base member.

There may be further included a bayonet joining mechanism between the base member and the pivoting member. The bayonet joining mechanism may provide a pivot centre for the pivoting member with respect to the base member with the pivot centre being positioned substantially at the centre of curvature of the first internal part spherical surface.

In one form, the base member may be adapted to be received in a mirror housing and the pivoting member is adapted to have a mirror support and mirror mounted on it. The base member can be mounted to the mirror housing by screws or alternatively the base member can be mounted into the mirror housing by means of hooks which engage one end of the base member into the mirror housing and a screw or similar arrangement to engage the other end.

The bayonet joining mechanism discussed above may include a ball joint. The ball joint may have a hemispherical concave surface on the base member and a hemispherical concave surface on the pivoting member. The pivot centre may be mounted on a radial post extending from the body such that the centre of rotation of the pivot member is substantially at the centre of curvature of the first part spherical surface.

In an alternative form, the invention may be said to reside in an external mirror assembly for a motor vehicle, comprising a base and an adjustable mirror head and a pivot and vibration absorption mechanism on the base allowing manual adjustment of the mirror head with respect to the base, the pivot and vibration absorption mechanism having a ball joint to enable pivoting and frictionally engaging faces spaced apart from the ball joint on the base and the mirror head to provide vibration absorption, characterised by the respective faces comprising part spherical surfaces resiliently urged together.

The resilient urging of the part spherical surface together may be provided by a spring means. The spring means may be a spring clip.

Preferably the spring clips provide frictional engagement of the respective faces to give non-resilient feel for adjustment of the mirror and to prevent vibration of the mirror during motion of the vehicle.

There may be further included means to prevent relative rotation of the mirror head with respect to the base about an axis at right angles to the plane of the mirror. Such a means may be a yoke which is fastened to the base and to the pivot mechanism to prevent the relative rotation whilst allowing adjustment as discussed above.

The base may be received in a mirror housing. The mirror housing may be pivotally mounted to the side of a vehicle so that the mirror can be folded away to enable parking or in the case of an accident.

In a further form the invention may be said to reside in an external mirror assembly for a motor vehicle having a base and a mirror head and adapted to control movement of the mirror head with respect to the base, the base having a body defining a first internal concave part spherical surface and a plurality of first tongues together defining a second external convex part spherical surface having a radius of curvature less than the radius of curvature of the first part spherical surface, mirror head having a plurality of second tongues, faces of the tongues together defining a third external convex part spherical surface and a fourth internal concave part spherical surface having a radius of curvature less than the third external surface, the second tongues adapted to engage between the first internal surface and the first tongues, and a resilient means adapted to urge the first tongues against the first surface thereby engaging the second tongues between them to provide frictional load against movement of the mirror head with respect to the base.

BRIEF DESCRIPTION OF THE DRAWINGS

This then generally describes the invention, but to assist with understanding reference will now be made to the accompanying drawings which show preferred embodiments of the invention.

In the drawings.

DESCRIPTION OF PREFERRED EMBODIMENTS

Figure 1:
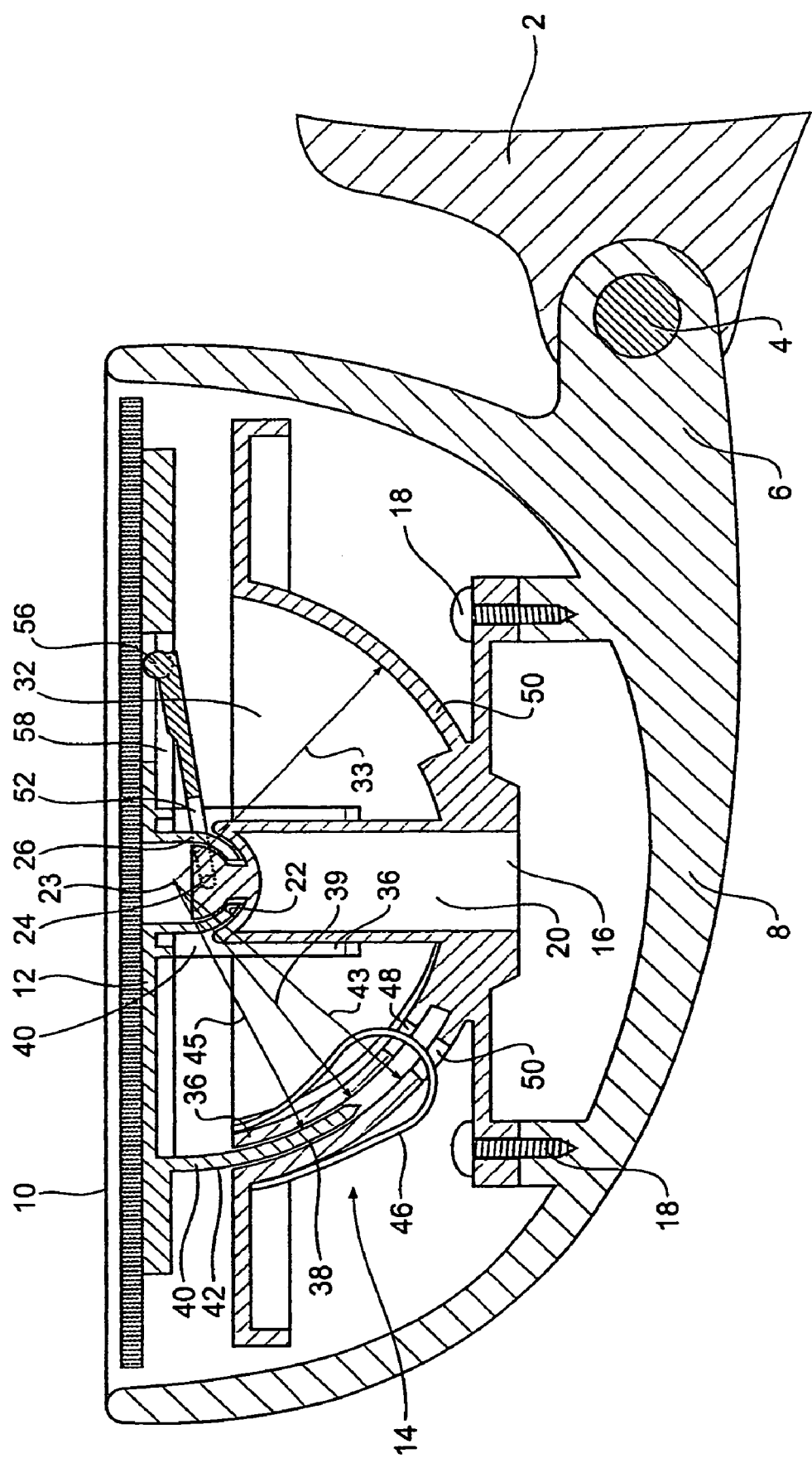
FIG. 1 shows a transverse cross sectional view, along the lines 1–1' of FIGS. 2 and 3, of a motor vehicle external mirror including the pivot and vibration absorption mechanism of the present invention.
Figure 2:
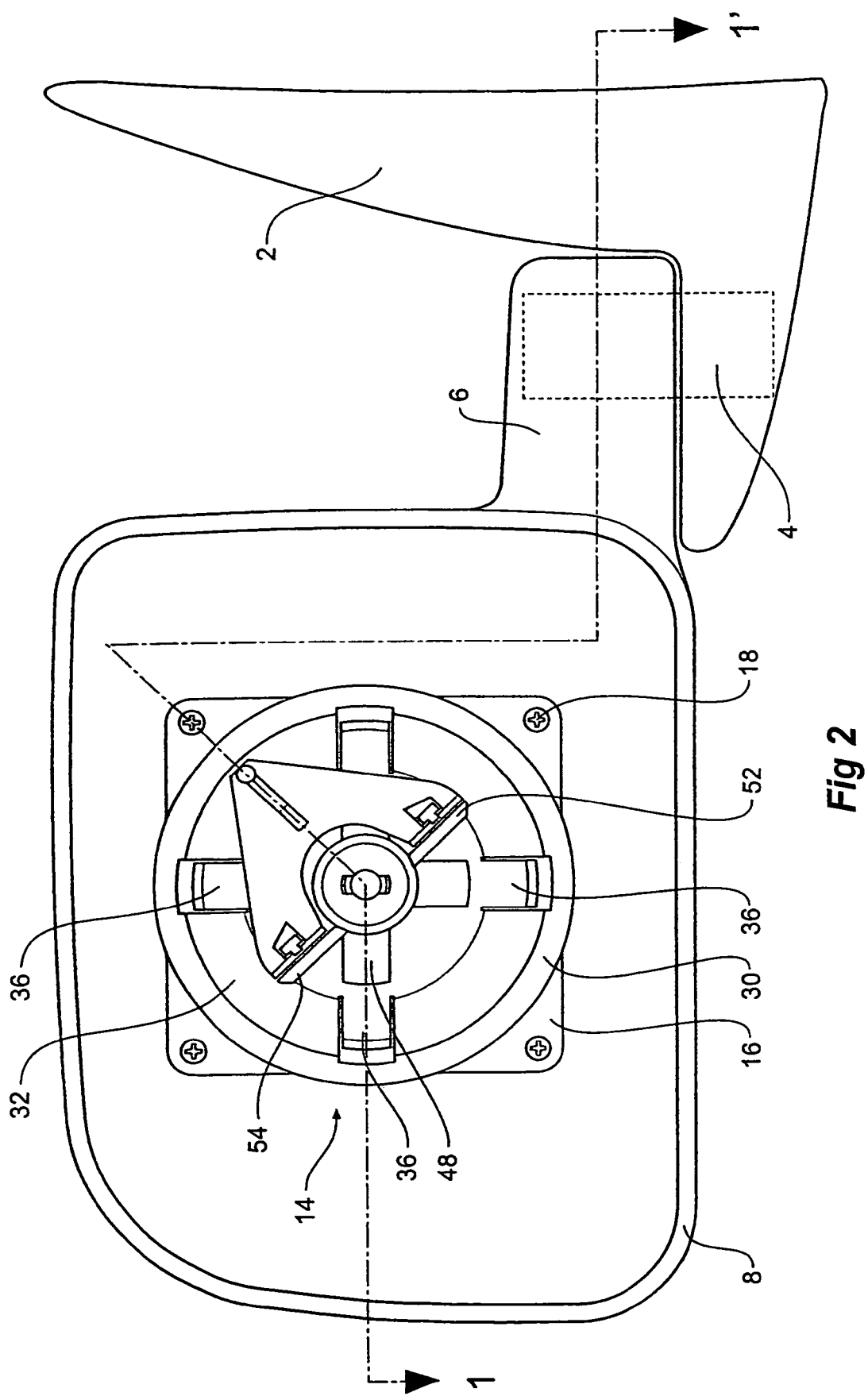
FIG. 2 shows an elevation view of the mirror support, with the mirror head removed to show the mechanism inside.
Figure 3:
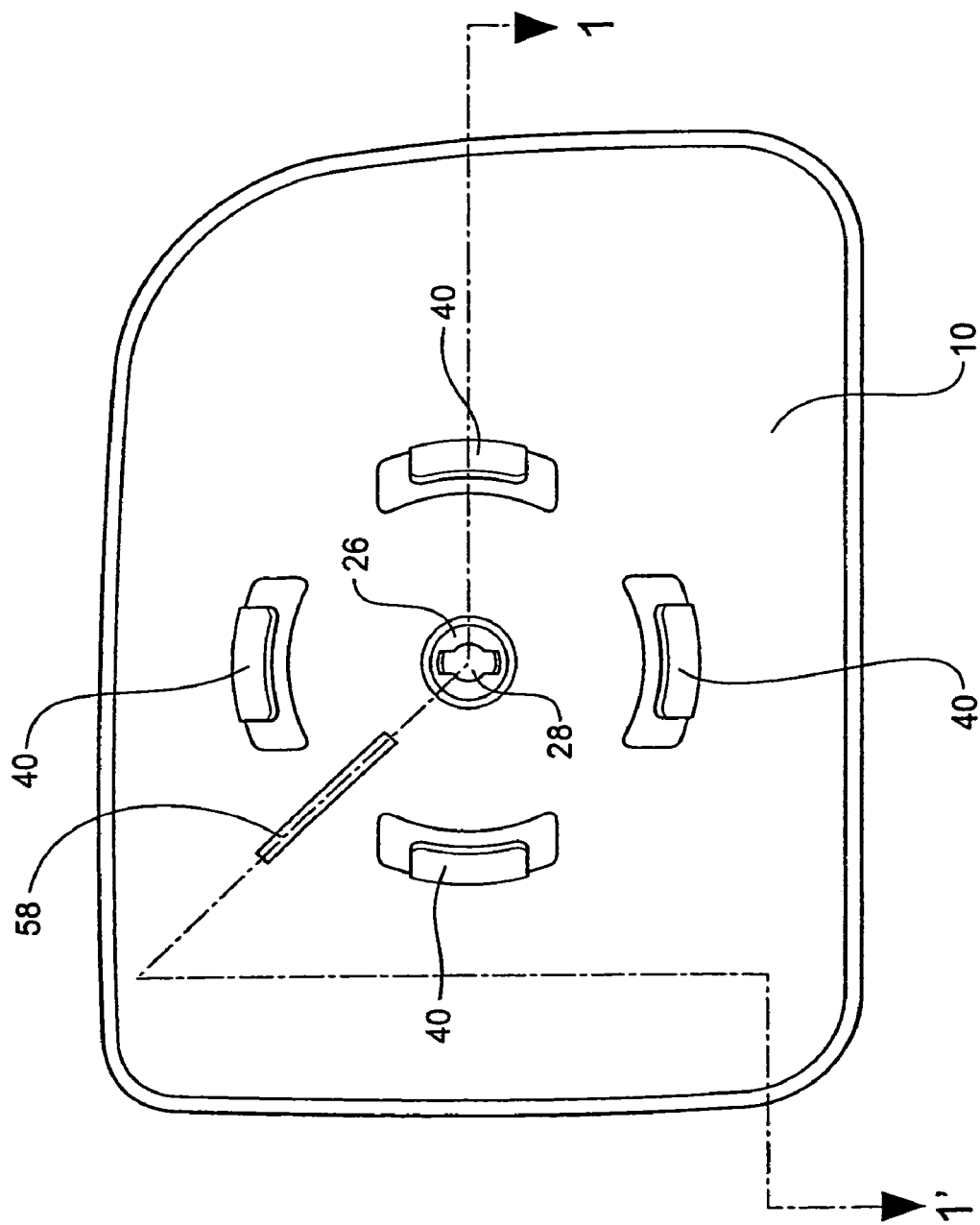
FIG. 3 shows a rear view of the mirror head.

Now looking more closely at the drawings, and in particular the embodiment shown in FIGS. 1 to 3 it will be seen that the motor vehicle external mirror includes a mirror mount 2 adapted to be fastened to the side of a vehicle and a rotation mechanism 4 mounted to the mirror mount 2 and to a post 6 extending from a mirror housing 8. A mirror 10 supported on a mirror support 12 is supported in the mirror housing 8 on a pivot and vibration absorption mechanism generally shown as 14.

The pivot and vibration absorption mechanism 14 has a base 16 which is mounted into the mirror housing 8 by means of screws 18. The base has a central post 20 with at its upper end a concave recess 22 with a bayonet connection pin 24 in the middle of it. The mirror support 12 has a concave protrusion 26 extending from its rear surface with a slot 28 adapted to receive the bayonet connection pin 24. The protrusion 26 bearing in the concave recess 22 provides a ball type pivot joint rotatable about a pivot point 23 defined by the concave recess 22 and concave protrusion 26. The pivot joint enables the mirror support 12 and mirror 10 to be moved so that a driver can adjust the angle of the mirror.

On the base 16 is an essentially cup shaped body 30 defining a substantially spherical first concave inner surface 32 with a radius of curvature 33. Within the cup shaped body 30 and mounted to the body, are four tongues 36 each defining a convex part spherical surface 38 with a radius of curvature 39 which is of a lesser radius of curvature than the concave part spherical inner surface 32 and having essentially the same centre of curvature being the pivot point 23.

The mirror support 12 has a series of four tongues 40 arranged in a circle around the protrusion 26 on the support 12. Each of the tongues 40 have faces which together define a third external convex part spherical surface 42 with a radius of curvature 43 and a fourth concave part spherical surface 44 with a radius of curvature 45 with the radius of curvature of the fourth surface 44 being less than the radius of curvature of the third surface 42 and the third external convex part spherical surface 42 and the fourth concave part spherical surface 44 having essentially the same centre of curvature being the pivot point 23 when the mirror head is assembled into the mirror support.

The tongues 40 fit in between the tongues 36 and the cup shaped body 30 to provide a vibration absorption mechanism. A spring clip 46 engages the tongues 36 and the cup shaped body 30 to draw the two of these together to engage the tongues 40 between them to provide frictional load to be felt during adjustment of the angle of the mirror. The spring clips pass through apertures 48 in the tongues 36 and 50 in the body 30.

A yoke mechanism 52 which is mounted by a hinge to a transverse arm 54 extending from the post 20 as shown in FIG. 2 has a ball 56 which engages in a slot 58 on the mirror support 12. This prevents the mirror rotating in an axis normal to the plane of the mirror about the pivot joint while still allowing angular adjustment of the mirror about the pivot point 23.

Figure 4:
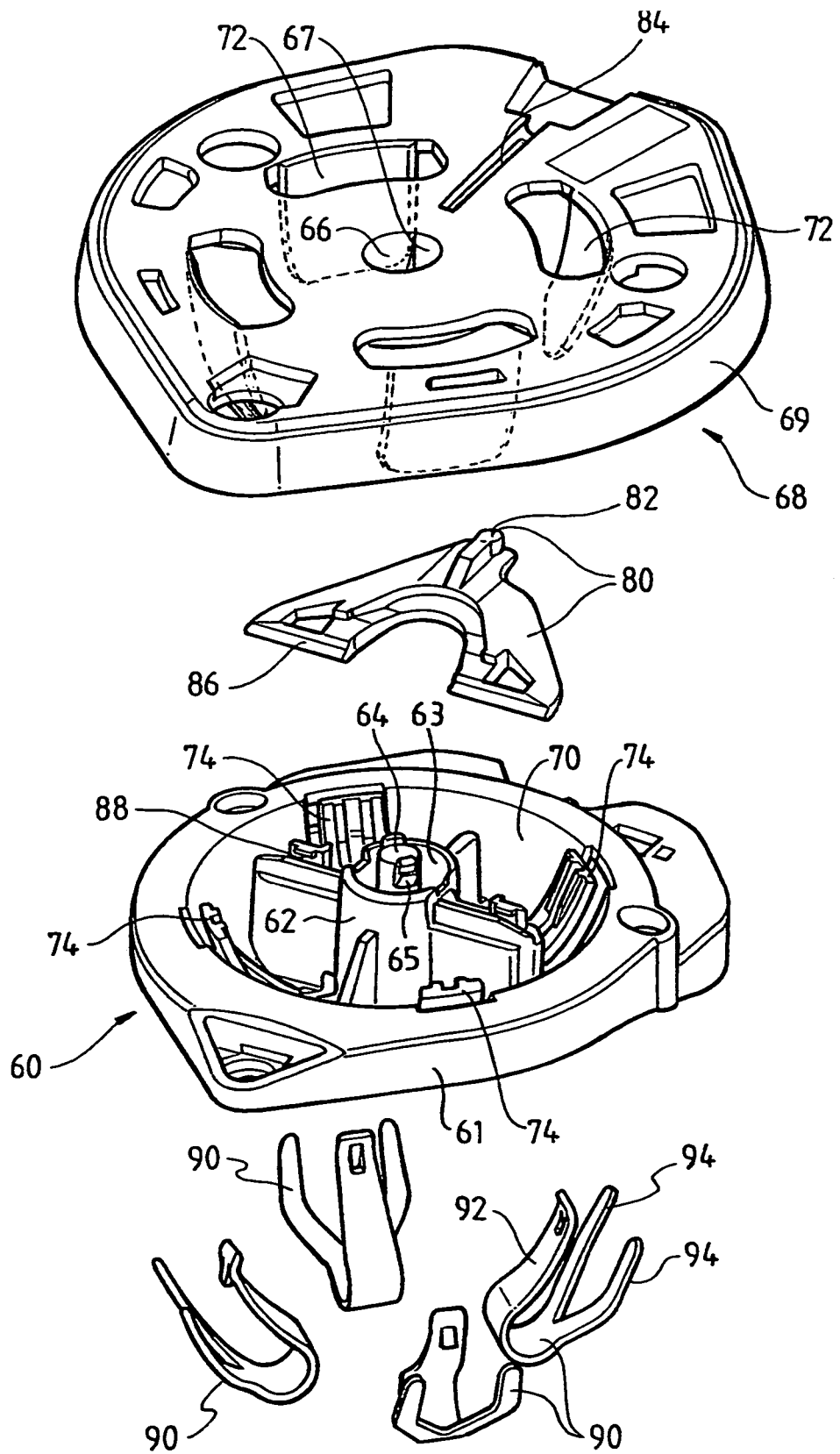
FIG. 4 shows an alternative embodiment of pivot mechanism according to this invention.

FIG. 4 shows an alternative embodiment of the invention.

In this embodiment a base member 60 is adapted to be received in a mirror support (not shown) and a mirror head (not shown) is mounted onto a pivoting member 68 and the pivoting member is mounted into the base member.

The base member 60 has a body 61 with a central post 62 with a concave recess 63 at its upper end with a bayonet connection arrangement 64 with wings 65 within the concave recess 63. The bayonet connection arrangement 64 is adapted to be received in an aperture 66 in a pivoting member 68 when the parts are assembled The aperture 66 has a transverse slot 67. The base member has a first concave internal surface 70 with tongues 74 positioned radially inwards from the concave surface 70 and mounted to the base member 60. Tongues 72 extending from the pivoting member 68 engage between the tongues 74 and concave surface 70 to provide frictional engagement for feel during pivoting of the pivoting member 68 with respect to the base member 60. A yoke arrangement 80 has a ball joint 82 which engages in slot 84 in the pivoting member 68 and has pivots 86 which engage in hinges 88 on a cross member on the base member 60. The yoke is used to prevent rotation of the pivoting member 68 with respect to the base member 60 while allowing pivoting or angular adjustment.

Spring clips 90 have legs 92, 94 which engage the inner surface of the tongues 74 and the outside of the base member 60 respectively to urge the tongues 74 against the concave surface 70 to engage the tongues 72 between them to provide frictional engagement.

To assemble the pivoting member 68 onto the base member 60 the following steps are taken. The yoke 80 is fitted onto the hinges 88. The pivoting member 68 is offered up to the base member with the transverse slot 77 aligned with the wings 65 on the bayonet connection arrangement 64 and the tongues 72 on the pivoting member 68 circumferentially spaced from the tongues 74 on the base member 60. The pivoting member 68 is then rotated with respect to the base member 60 until the ball joint 82 on the yoke 80 aligns with the slot 84 and the tongues 72 pass between the tongues 74 and the first concave internal surface 70. At this stage the bayonet connection is made and the pivoting member can be depressed on the region of the slot 84 to engage the ball joint 82 into the slot. Next the spring clips 90 are engaged between the tongues 74 and the outside of the base member 60 to provide the friction necessary to prevent vibration while a motor vehicle is being driven while still allowing mirror adjustment.

It will be seen therefore, that by this invention, there is provided a frictional engagement of a pivoting member with respect to a base member to provide feel for adjustment of the mirror and vibration absorption Throughout this specification, various indications have been given as to the scope of the invention, but the invention is not limited to any one of these, but may reside in two or more of these combined together. The examples are given for illustration only, and not for limitation.

The claims defining the invention are as follows:

1. A movement controller assembly for a mirror comprising a base member and a pivoting member adapted to control movement of the pivoting member with respect to the base member, the pivot member allowing manual adjustment of the pivot member with respect to the base member, the pivot member having a ball joint to enable pivoting and frictionally engaging faces on the base and pivot member to provide vibration absorption by the respective faces being part spherical surfaces spaced apart from the ball joint and urged together by a resilient portion;
    a yoke member pivotally connected to said base member and said pivot member, wherein said yoke member prevents the relative rotation of said base member to said pivot member.

2. A movement controller assembly as in claim 1 wherein the resilient portion is a spring arrangement.

3. A movement controller assembly as in claim 2 wherein the spring arrangement is a spring clip wherein the spring clip provides frictional engagement of the respective faces to give non-resilient feel for adjustment of the mirror and to prevent relative vibration of the base member and the pivoting member.

4. The movement controller assembly of claim 1 wherein said yoke further comprises:
    a first end mounted by a hinge to said base member; and
    a second end slidably engaged to said pivot member.

5. The movement controller assembly of claim 4 wherein said pivot member has a slot and said second end of said yoke has a ball that slidably engages said slot.

6. The movement controller assembly of claim 1 wherein said yoke prevents the pivot member from rotating in an axis normal to the plane of said pivot member about said ball joint.

7. An external mirror assembly for a motor vehicle, comprising a base and an adjustable mirror head and a pivot and vibration absorption mechanism on the base allowing manual adjustment of the mirror head with respect to the base, the pivot and vibration absorption mechanism having a ball joint to enable pivoting and frictionally engaging faces spaced apart from the ball joint on the base and the mirror head to provide vibration absorption by the respective faces comprising part spherical surfaces resiliently urged together by a resilient portion; and
    a yoke member pivotally connected to said base and said mirror head wherein said yoke member prevents the relative rotation of said base to said mirror head.

8. An external mirror assembly for a motor vehicle as in claim 7 wherein the resilient portion is a spring arrangement.

9. An external mirror assembly for a motor vehicle as in claim 8 wherein the spring arrangement is one or more spring clips wherein the spring clips provide frictional engagement of the respective faces to give non-resilient feel for adjustment of the mirror and to prevent relative vibration of the base member and the mirror head.

10. The external mirror assembly for a motor vehicle of claim 7, wherein said yoke further comprises:
    a first end mounted by a hinge to said base; and
    a second end slidably engaged to said mirror head.

11. The external mirror assembly for a motor vehicle of claim 10 wherein said mirror head has a slot and said second end of said yoke has a ball that slidably engages said slot.

12. The external mirror assembly for a motor vehicle of claim 7 wherein said yoke prevents the mirror head from rotating in an axis normal to the plane of said mirror head about said ball joint.

* * * * *